United States Patent [19]

Hoffmann et al.

[11] 4,264,291
[45] Apr. 28, 1981

[54] EQUIPMENT FOR THE CONTINUOUS PRODUCTION OF FOAM BOARDS

[75] Inventors: Erwin Hoffmann, Leverkusen; Werner Dietrich, Koeln-Dellbrueck; Karl J. Kraft, Leverkusen, all of Fed. Rep. of Germany

[73] Assignee: Bayer Aktiengesellschaft, Leverkusen, Fed. Rep. of Germany

[21] Appl. No.: 86,104

[22] Filed: Oct. 18, 1979

[30] Foreign Application Priority Data

Jun. 15, 1979 [DE] Fed. Rep. of Germany ....... 2924183

[51] Int. Cl.³ .............................................. B29D 27/04
[52] U.S. Cl. .................................... 425/224; 264/46.2; 264/46.3; 264/51; 264/331.19; 425/817 C
[58] Field of Search ................... 425/4 C, 224, 817 C; 264/54, 46.2, DIG. 84, 46.3, 338, 101, 51, 331

[56] References Cited

U.S. PATENT DOCUMENTS

| | | | |
|---|---|---|---|
| 2,957,207 | 10/1960 | Roop et al. | 264/54 |
| 3,007,200 | 11/1961 | Paulsen et al. | 264/46.2 X |
| 3,832,099 | 8/1974 | Berg | 425/224 X |
| 4,060,579 | 11/1977 | Schmitzer et al. | 425/4 C X |
| 4,102,621 | 7/1978 | Talbert | 264/DIG. 84 |
| 4,154,562 | 5/1979 | Tabler | 264/DIG. 84 |
| 4,177,028 | 12/1979 | Dillard | 264/DIG. 84 |

FOREIGN PATENT DOCUMENTS 0000058 12/1978 European Pat. Off. ......... 264/DIG. 84

Primary Examiner—Philip Anderson
Attorney, Agent, or Firm—Gene Harsh; Joseph C. Gil; R. Brent Olson

[57] ABSTRACT

The invention relates to equipment for the continuous production of foam boards, which may be laminated between facings, from a liquid foamable reaction mixture. The apparatus broadly comprises
(i) a conveyor,
(ii) an inclined table at one end of said conveyor, the incline of said table sloping downwardly toward said conveyor,
(iii) a foam mixture application device located above said downwardly sloping surface, and
(iv) a transverse foam mixture distribution device located downstream of said application device and located above said downwardly sloping surface thereby forming a space therewith. When sheets or relatively thin foam boards or sandwich boards are produced, the device used is generally additionally equipped with an upper conveyor. This invention primarily relates to such double conveyors. The liquid reaction mixture must be applied over the entire width in a particularly uniform layer in order to obtain a perfect final product. The device of the invention can also be used for the continuous foaming of buns.

2 Claims, 3 Drawing Figures

EQUIPMENT FOR THE CONTINUOUS PRODUCTION OF FOAM BOARDS

BACKGROUND OF THE INVENTION

The known equipment for the production of foam boards generally consists of a conveyor, either an inclined or horizontal table at one end of the conveyor, an application device located above the table, and a distribution device located downstream of the table. A roller or a rake is generally provided as the distribution device. If a lower facing is used, it may be guided over the table and must stay in contact at the break point between the table and the conveyor.

The facing may, however, also be guided from underneath the table. This option is especially utilized when using stiff or rigid facings. In this case, the inclined table is preferably coated with a layer of polytetrafluoroethylene or silicone to prevent the mixture from sticking to it. In principle, all equipment parts which come in contact with the reaction mixture or with the forming foam could be provided with such a coating. In production, however, the use of facings, particularly of paper facings, has proved to be safer and more useful.

The problem with such known equipment is that the reaction mixture applied to the table cannot be distributed in time over the entire width before the reaction starts. Due to the relatively longer flow length, the reaction mixture begins to foam at the sides, before it passes the levelling (or distribution) device. This causes irregular sides due to insufficient and irregular filling of the cross section and/or cellular striations are formed.

It is the purpose of the invention to improve the application of the mixture over the entire width so that a substantially perfect end product is produced, which has well-formed sides and homogeneous foam thickness.

DESCRIPTION OF THE INVENTION

Figure 1:
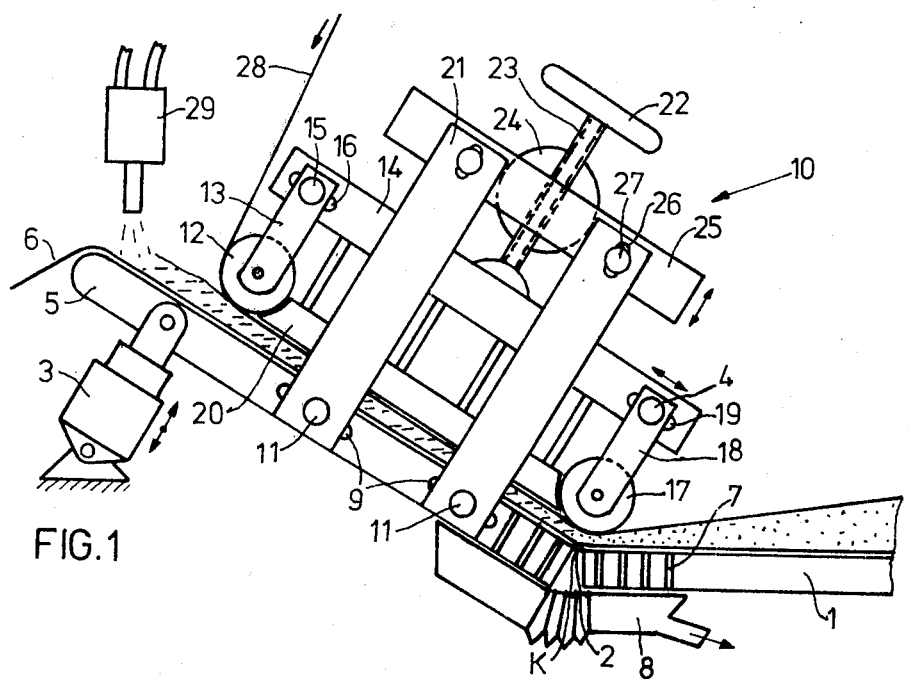
FIG. 1 shows a side view of the pouring end according to one embodiment of the invention.

The above purpose is accomplished according to the instant invention by following a relatively simple expedient. Specifically, the instant invention is directed to an apparatus comprising
  (i) a conveyor,
  (ii) an inclined table at one end of said conveyor, the incline of said table sloping downwardly toward said conveyor,
  (iii) a foam mixture application device located above said downwardly sloping surface, and
  (iv) a transverse foam mixture distribution device located downstream of said application device and located above said downwardly sloping surface thereby forming a space therewith.

It was surprisingly dicovered that this measure (i.e. placing the distribution device above the inclined table) promotes uniform transverse distribution. Thus, the mixture, which flows from the outflow of the mixing device with a certain amount of pressure, is blocked by the distribution device and is immediately distributed toward the sides. The distribution effect increases as the flow velocity from the mixhead increases and as the inclination angle of the table is adjusted. By utilizing the apparatus of the invention, fast-reacting mixtures may be processed. Depending on the degree of reactivity of the particular mixture used, it may be advantageous to keep the distance between the distribution device and the break point relatively high. In this way, a certain stabilization of the mixture can be achieved. On the other hand, the distance should not be too great (particularly when the inclination angle of the table is high) so that no delay or bottom splash occurs.

According to one embodiment of the apparatus of the invention, the space formed between the transverse distribution device and the upper surface of the inclined table has a varied height over the entire width of the apparatus. The space is more narrow in the center of the advance direction behind the application point and becomes higher toward the sides. If the transverse distribution device consists of a roller, it may be correspondingly crowned; if it consists of a skid or a rake, the surface pointing toward the table should be correspondingly contoured. Alternatively or in combination with this, the table may be correspondingly curved from the center toward the edges. Preferably, the space height can be adjusted over the width. This makes it possible to utilize this embodiment to the maximum benefit.

The space location is also preferably adjustable. Thus, the transverse distribution device can preferably be moved along the table, preferably parallel to the inclined surface of the table.

If no facing is used, the transverse distribution device may be coated with an anti-adhesive layer such as PTFE or silicone. Since industry, however, operates almost exclusively with an upper facing, such facing can be guided over the transverse distribution device through the space.

To prevent the facing from lifting up behind the transverse distribution device, a facing guide can be provided, which extends at least up to the break point between the table and the conveyor. This guide may be designed in substantially any form. According to one embodiment, at the break point, a belt guide roller can be provided whose height above the break point or toward the table and/or toward the conveyor can be adjusted. The surface between the transverse distribution device and the guide can be advantageously filled by a plate to support the upper facing. When the transverse distribution device is designed as a roller, a belt running around both rollers may be provided. One of the rollers is preferably driveable, where the transport velocity is synchronized with the transport velocity of the lower conveyor.

According to another embodiment, the guide is combined with the transverse distribution device and reaches at least down to the break point.

Preferably, the transverse distribution device forms one unit together with the guide, and is adjustable as a whole. The adjustability is provided in a direction vertical to the table, and is preferably provided also by swinging around the axis of the transverse distribution device or around the guide roller located in the break point in order to adjust the space smaller or wider in the advance direction.

Reference will now be made to the drawings. From the conveyor equipment in FIG. 1 is shown only and partly a glide table 1 serving as conveying surface and being equipped ahead of the conveyor belt which is not shown. Ahead of this is a movable table 5 which can be swiveled around the axis 2 with an adjustable support 3. Above the table is a guided lower facing 6 which is made to adhere at the break point K between table 5 and glide table 1 with air suction. For this purpose, a suction box 8 is arranged in the area of the break point K below the table 5 and the conveyor 1, both of which have perforations 7. Lateral guide slots 9 are provided in the table 5 in which a film guide device/distribution device 10 is provided. The assembly 10 can be moved in advance direction and locked with clamping screws 11. The assembly includes a transverse distribution device 12 designed as a roller, whose bearing brackets 13 are fixably mounted in a base 14 with clamping screws 15 in elongated slots 16. At the other end of the base 14, above the break point K, a sheet guide roller 17 is provided. Its bearing brackets 18 are also movable in elongated slots 19 and can be locked with clamping screws 4. Between the transverse distribution device 12 and the guide roller 17 is an exchangeable guide plate 20 which is also mounted to the base 14. If the distance between the transverse distribution device 12 and guide roller 17 is to be changed, a correspondingly sized guide plate 20 is used. The base 14 is guided between the side parts 21 and is suspended with a spindle 23 which is operable by a hand wheel 22. The wheel is mounted in a swivel 24 which is guided in a base plate 25. The plate 25 can be adjusted in height in the side parts in slots 26 and is lockably guided with clamping screws 27. An upper facing 28 is guided over the distribution device 12, the guide plate 20 and the guide roller 17. The mixhead is designated with 29. With this construction, the film guide assembly 10 can be adjusted so that it forms with table 5 a space of the desired height and optionally desired narrowing or expansion.

Figure 2:
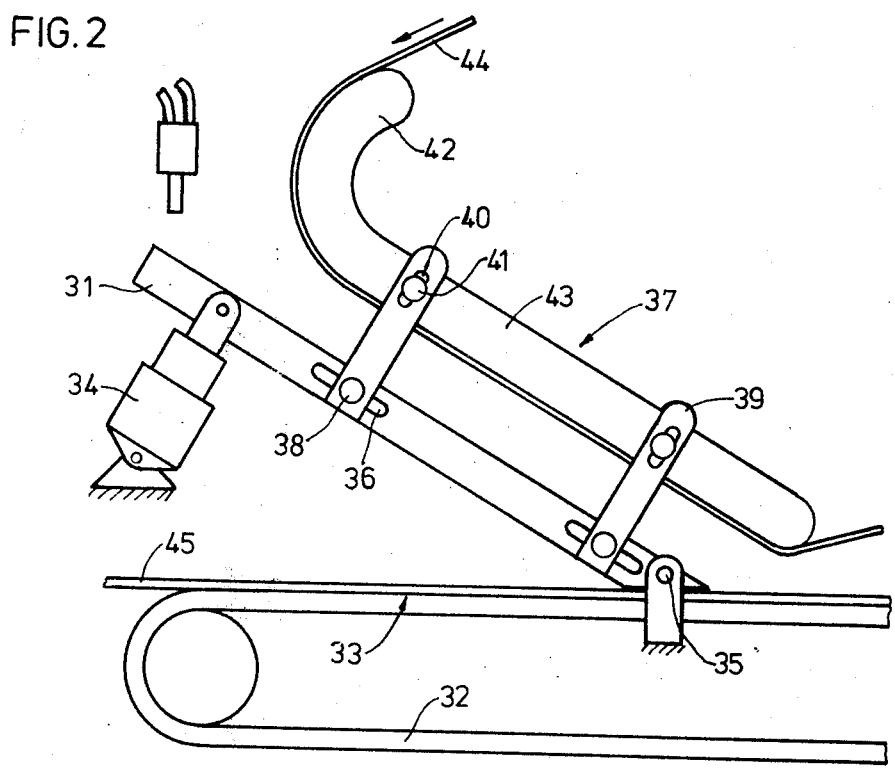
FIG. 2 shows a side view of the pouring end according to a second embodiment of the invention.

In FIG. 2, the inclined table 31 is arranged above the conveyor belt 32 whose upper strand serves as conveyor 33. The table 31 can be pivoted with an adjustable support 34 around the axis 35 so that its inclination is adjustable.

In lateral elongated slots 36 a film guide assembly 37 is movable with longitudinal movement and is lockable with clamping screws 38. The assembly 37 consists of lateral parts 39 which have vertical slots 40 toward the table 31. They hold a transverse distribution device 42, which is designed as a skid, with clamping screws 41. The assembly has a long sheet guide extension 43. The back end of the extension 43 serves as guide device for the upper facing 44. If a shorter or a longer film guide device is needed, this part can easily be exchanged for another one. Alternatively, the extension can be designed telescopically expandable. Such a construction permits any desired adjustability of the space between table 31 and film guide assembly 37. The bottom facing 45 can be rigid. If rigid, it is guided from underneath the application table 31 which table is coated with a silicone layer.

Figure 3:
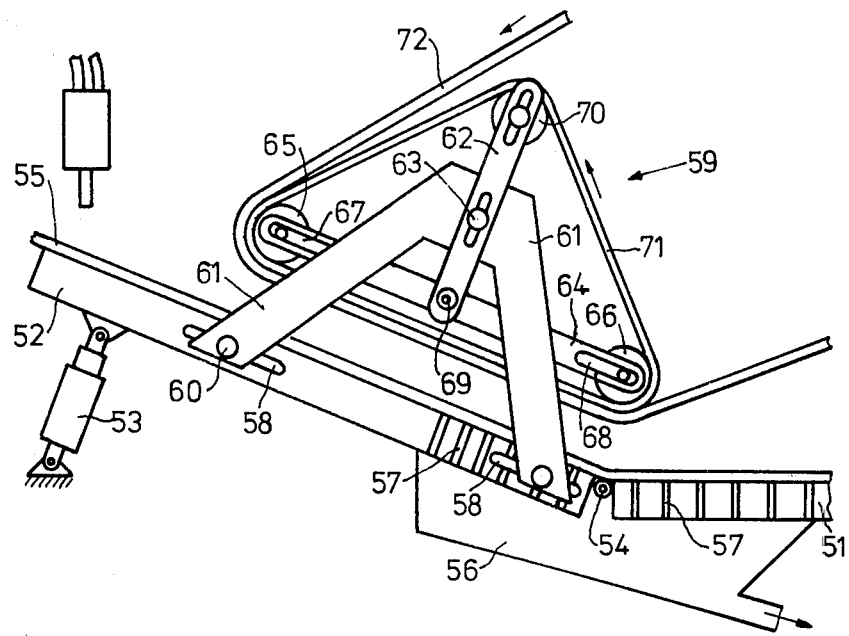
FIG. 3 shows a side view of the equipment according to a third embodiment.

The glide table in FIG. 3 serving as conveyor surface 51 is preceded by an inclined table 52. The inclination of table 52 is adjustable and can be pivoted around the axis 54 via adjustable support 53. A bottom facing 55 is guided above the table 52 and the conveyor surface 51. At the break point between table 52 and conveyor 51 the facing is made to adhere through suction force. For this purpose, a suction box 56 is provided underneath the table 52 and the conveyor 51. The table 52 and the conveyor 51 have perforations 57 in the area of the suction box 56. Lateral elongated slots 58 are provided in the table 52 in which a film guide assembly 59 is adjustably and lockably mounted with clamping screws 60. The assembly 59 consists of lateral parts 61, each of which has a support 62 with clamping screws 63 adjustable in the vertical direction to the table 52. The supports 62 carry a frame 64 in which a transverse distribution device 65 designed as a roller and a guide roller 66 are provided. The rollers 65, 66 are movably and lockably guided in elongated slots 67, 68. The frame 64 is mounted in the supports 62 and is movable and lockable relative thereto. Clamping screws 69 may be used for this purpose. The upper end of the support 61 is equipped with an adjustable tension roller 70 which is used to tighten the continuous band 71, which band runs over the rollers 65, 66. This band 71 is driven in synchronization with the velocity of the conveyor belt (which is not shown) so that the upper facing 72 is transported with the same velocity as the lower facing 55.

If desired and/or necessary, the table and/or the conveyor and/or both may be heated or cooled to influence the rate of foaming and reaction.

The invention is further illustrated but is not intended to be limited by the following Examples in which all parts and percentages are by weight unless otherwise specified.

EXAMPLE

A double conveyor belt by Maschinenfabrik Hennecke GmbH, St. Augustin 1, Federal Republic of Germany was used. This equipment was provided with a fixed mixhead and its construction is essentially according to that shown in FIG. 2. The bottom facing was guided above the table and was held in the break point by suction effect. The advance velocity of the conveyor was 10 m/min. 14 l/min of reaction mixture were applied. The operation width was 1.25 m. Sandwich boards with 0.1 mm thick paper facings covering a rigid foam core on both sides were to be produced. The total thickness of the boards was to be 40 mm. The application table was cooled to 15° C. and the glide table was heated to about 30° C.

The following reaction mixture was used:
- 40 pbw of a sucrose ether with the OH number 520,
- 12 pbw of an ethylenediamine-started polyether with the OH number 480,
- 12 pbw glycerine,
- 1.8 pbw water,
- 1.5 pbw of a silicone stabilizer (type OS 710 by Bayer AG, Leverkusen, Federal Republic of Germany),
- 1.5 pbw dimethylcyclohexylamine,
- 45 pbw trifluorochloromethane,
- 201 pbw crude 4,4-diphenylmethane diisocyanate (Desmodur$^R$ 44V20 by Bayer AG, Leverkusen).

The reaction time of this mixture was 120 seconds, 10 seconds of which were for the cream time, 20 seconds for the tack-free time, and 90 seconds for the curing time [definitions according to "Kunststoffhandbuch" (Plastics Handbook) Volume VII, "Polyurethane" Vieweg and Hochtlen, Carl-Hanser Publishing House, Munich 1966].

Test 1

The mixture application point was 1.25 m ahead of a 100 mm diameter roller serving as transverse distribution device. The levelling space had a height of 1.5 mm. No inclined table was present. Completely unusable sandwich boards were produced because the reaction mixture could only be spread to a width of 100 mm before it started to foam.

Test 2

Instead of a transverse distribution device, a table was provided which had an inclination of 8°. Here again, insufficient transverse distribution was encountered which led to unusable sandwich boards.

Test 3

A combination of the transverse distribution device according to test 1 with the inclined table according to test 2 was used. The distribution device was located at the break point. The mixture was completely distributed over the width; the edges, however, were formed unsatisfactorily and the thickness deviation was too great. The following thicknesses resulted over the entire width: Left edge 38 mm, at ¼ width 40 mm, at ½ width (center) 41 mm, at ¾ width 40 mm, right edge 36 mm. The thickness tolerance lies, therefore, at 10%. The average compressive strength of the product was 0.24 MPa (measured according to DIN 53 421). The density was 30 kg/m$^3$.

Test 4

Test 3 was repeated with the difference that the transverse distribution device shown in FIG. 2 and designed as a skid was arranged above the inclined table, and so close to the break point that for the upper facing behind the skid no additional guide devices were necessary. The application point was 0.50 m away from the skid. The finished product had a thickness in the left edge of 39.5 mm, at ¼, ½ and ¾ width each 40 mm and the right edge was 40.1 mm thick. The thickness tolerance was, thus, below 2%. The compressive strength of the product was 0.29 MPa, the density 30 kg/m$^3$.

What is claimed is:
1. An apparatus for the continuous production of foam boards comprising
   (i) a conveyor,
   (ii) an inclined table at one end of said conveyor, the incline of said table sloping downwardly toward said conveyor,
   (iii) a foam mixture application device located above said downwardly sloping surface, and
   (iv) a transverse foam mixture distribution device located downstream of said application device and located above said downwardly sloping surface, thereby forming a space with said sloping surface.
2. The apparatus of claim 1, characterized in that a film guide device is provided downstream of said distribution device.

* * * * *